(12) United States Patent
Kriz et al.

(10) Patent No.: US 6,361,240 B1
(45) Date of Patent: Mar. 26, 2002

(54) CONNECTION ARRANGEMENT FOR A HYDRODYNAMIC TORQUE CONVERTER

(75) Inventors: Karel Kriz, Poppenhausen/Kützberg; Wolfgang Gude, Niederwerrn; Friedrich Schramm, Schonungen/Forst; Werner Spohn, Dittelbrunn/Hambach; Peter Frey, Gerolzhofen, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/494,703

(22) Filed: Jan. 31, 2000

(30) Foreign Application Priority Data

Feb. 12, 1999 (DE) .......................... 199 05 853

(51) Int. Cl.[7] .............................. F16D 33/00
(52) U.S. Cl. .................. 403/287; 403/208; 192/3.29
(58) Field of Search ................. 403/287, 208, 403/190, 200, 187; 192/3.28, 3.29

(56) References Cited

U.S. PATENT DOCUMENTS

| | | | | |
|---|---|---|---|---|
| 3,808,809 A | * | 5/1974 | Upton | 60/347 |
| 4,613,022 A | * | 9/1986 | Nishimura | 192/3.29 |
| 4,951,467 A | * | 8/1990 | Walsh et al. | 192/3.28 |
| 5,203,835 A | * | 4/1993 | Kohno et al. | 192/3.29 |
| 5,458,463 A | * | 10/1995 | Chiang | 416/210 |
| 5,813,505 A | * | 9/1998 | Olsen et al. | 192/3.28 |
| 5,829,561 A | * | 11/1998 | Arhab | 192/3.28 |
| 5,899,311 A | * | 5/1999 | Yamamoto et al. | 192/3.29 X |
| 5,979,621 A | * | 11/1999 | Schoder | 192/3.29 |
| 6,026,941 A | * | 2/2000 | Maienschein et al. | 192/3.29 |
| 6,099,435 A | * | 8/2000 | Halene et al. | 192/3.29 |

* cited by examiner

*Primary Examiner*—Lynne H. Browne
*Assistant Examiner*—David E. Bochna
(74) *Attorney, Agent, or Firm*—Cohen, Pontani, Lieberman & Pavane

(57) ABSTRACT

A connection arrangement for producing a rotational connection of a hydrodynamic torque converter with a rotating shaft includes at least one connection element arrangable at a housing of the torque converter and having a first connection area connectable to the housing and a second connection area connectable to the rotating shaft, wherein the first connection area has a limited circumferential extension with respect to the rotational axis (A) of the converter. The first connection area may be arranged at the housing via a riveting.

8 Claims, 3 Drawing Sheets

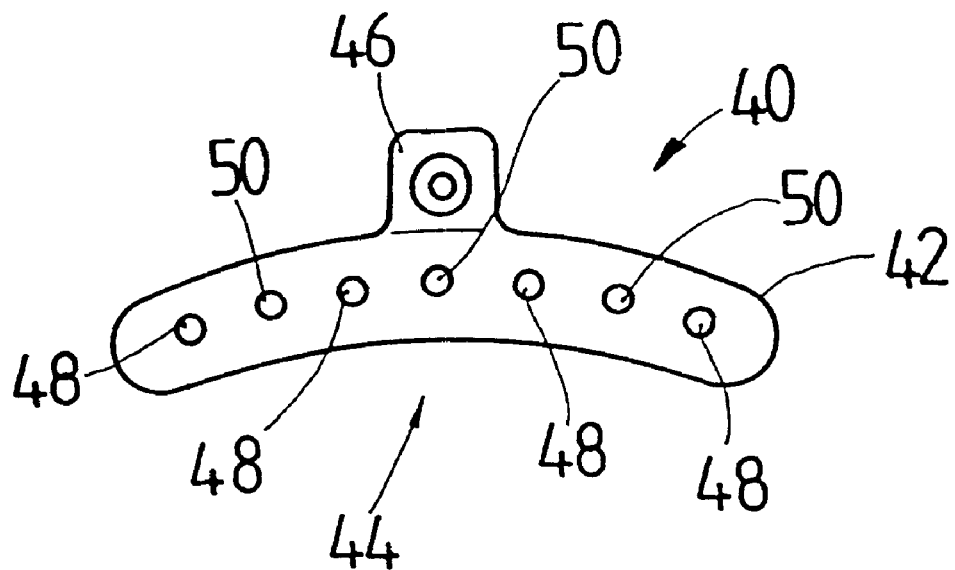
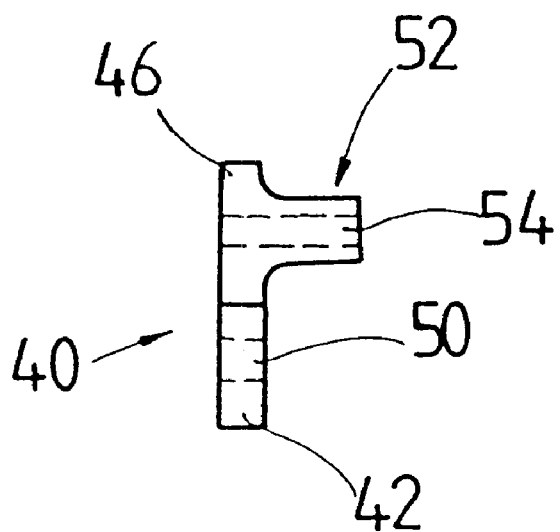

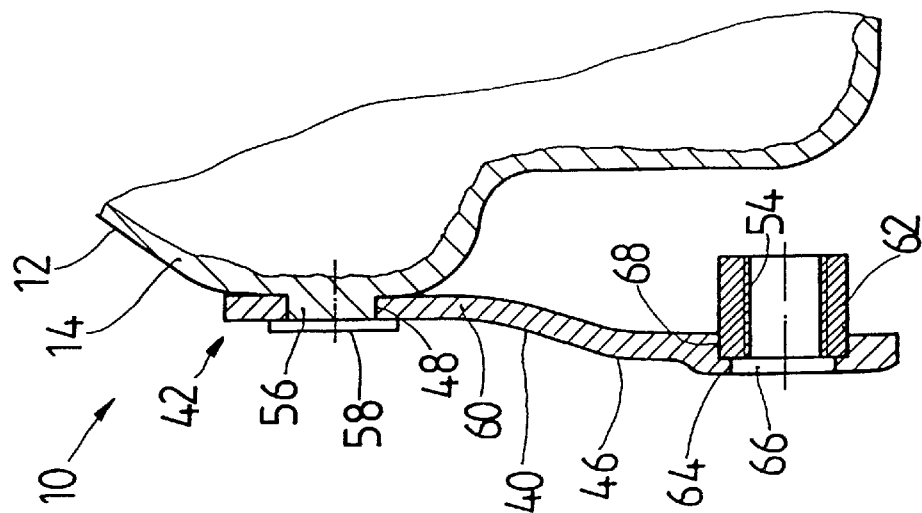
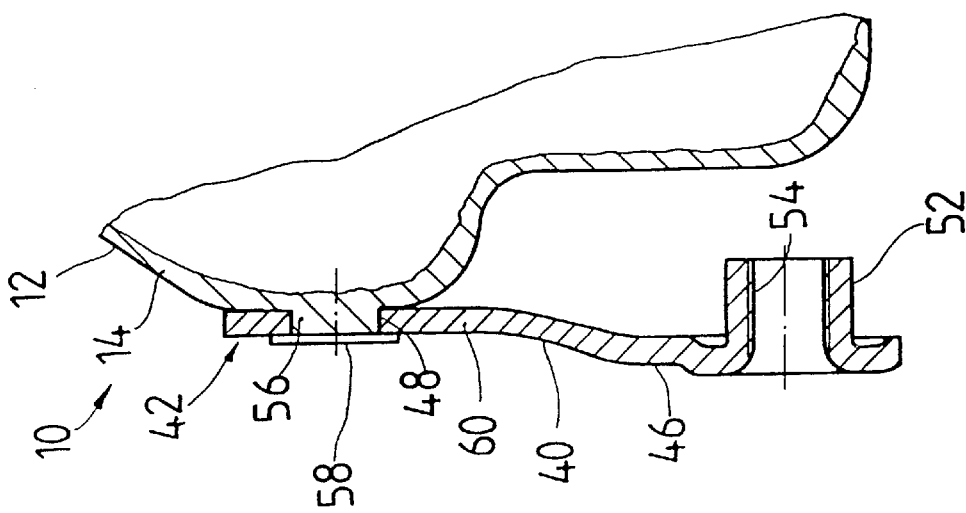

PRIOR ART

CONNECTION ARRANGEMENT FOR A HYDRODYNAMIC TORQUE CONVERTER

BACKGROUND OF THE INVENTION

1. Field of the Invention

The present invention relates to a connection arrangement for producing a rotational connection of a hydrodynamic torque converter to a rotating shaft, wherein the connection arrangement comprises at least one connection element arrangable at a housing of the torque converter having a first connection area connectable to the housing and a second connection area connectable to the rotating shaft or a component coupled therewith and the first connection area is constructed with a limited circumferential extension with respect to the rotational axis of the converter.

2. Description of the Related Art

A prior art connection arrangement for connecting a torque converter housing to a rotating shaft is known, for example, from German reference DE 44 24 989 A1. FIG. 5 of the present application shows a known connection arrangement for a hydrodynamic torque converter. The connection arrangement 10 comprises a plurality of nut elements 16 with an internal thread 18. The nut elements are arranged in succession in the circumferential direction at a converter housing 12, more specifically on a cover 14 of the converter housing 12. One axial end of the nut elements 16 comprises a first connection area 20 that is welded to the housing 12, i.e., the cover 14, thereof and the internal thread 18 of the nut elements 16 forms a second connection area 22. In the prior art connections, a flex-plate or similar device (not shown) is secured to a drive shaft. Screws or other threaded connection elements may be used to penetrate through-openings in the flex-plate or similar device and threadably engage into this second connection area 22. A disadvantage of a connection arrangement of this type formed by a plurality of successively arranged nut elements 16, is that the nut elements 16 are welded to the cover of the converter housing 12. Therefore, unwanted welding stresses are introduced into the converter housing and the deformation behavior of the converter housing is influenced under the effect of centrifugal force because the converter housing bulges outward due to the pressure in the interior of the converter. However, the nut elements 16 impede this bulging behavior at determined circumferential areas, ultimately resulting in a wavy deformation behavior considered in the circumferential direction. This is particularly undesirable because, as is shown in FIG. 5, the area in which these nut elements 16 are arranged coincides exactly with an area in which a piston 24 of a lockup clutch 26 contacts the inner surface of the housing cover 14 via friction facings 28 to achieve a connection between the housing 12 and a turbine wheel 30, so that the housing 12 and turbine wheel 30 are fixed with respect to relative rotation.

SUMMARY OF THE INVENTION

It is the object of the present invention to provide a connection arrangement for connecting a hydrodynamic torque converter with a rotational shaft so that they are fixed with respect to relative rotation and so that the connection arrangement does not impair the operating behavior of the torque converter and is simple to produce.

According to the invention, this object is met by a connection arrangement for producing a rotational connection of a hydrodynamic torque converter with a rotating shaft, wherein the connection arrangement comprises at least one connection element having a first connection area arrangeable at a housing of the torque converter and a second connection area connectable with the rotating shaft or a component coupled therewith. The first connection area is constructed with a limited circumferential extension with respect to a rotational axis of the converter.

It is further provided according to the present invention that the first connection area is arrangable at the housing by riveting.

The riveting of the at least one connection element with the converter housing has the essential advantage that the production process may be effected in a simple manner and that the introduction of heat energy into the converter housing when producing the connection is eliminated. Accordingly, no unwanted deformations of the converter housing requiring subsequent machining occur when making the connection according to the present invention. Furthermore, the production of the connection by riveting does not stiffen the housing which influences the operating behavior. Therefore, the lockup clutch operates substantially without hindrance even in the event of high centrifugal forces acting on the working fluid which causes bulging of the converter housing.

The at least one connection element has a defined arcuate extension that extends only a portion of a circumferential path about the rotational axis of the converter, i.e., the at least one connection element extends in an angular extension area of less than 360° with respect to the rotational axis of the converter. Accordingly, the connection element may be produced economically from strip material. The material waste generated in manufacturing a connection element of this type is appreciably reduced relative to a construction with a completely annular extension configuration.

At least one rivet opening for receiving a respective rivet portion is constructed in the first connection area. The preferred embodiment includes a plurality of rivet openings for receiving rivet portions.

When a plurality of rivet openings of this type are provided, the plural rivet openings are preferably arranged in succession along the circumferential direction.

In a corresponding manner, at least one protuberance formed as a rivet portion is provided in the housing. The preferred embodiment includes a plurality of protuberances formed as rivet portions.

To position the at least one connection element in a defined manner with respect to the housing, it is further suggested that at least one alignment recess in which a respective alignment projection engages at the housing is provided in the first connection region. In a preferred embodiment, a plurality of alignment recesses are provided in the first connection region.

In this respect, it is also advantageous when the at least one rivet opening and the at least one alignment recess are arranged in alternate succession along the circumferential direction.

The forces to be transmitted into the converter housing between the rotating shaft and the torque converter may be introduced in the most uniform manner possible when the first connection portion is an arcuate configuration.

The second connection portion may comprise a substantially plate-like part proceeding from the first connection portion. A configuration of this type has many advantages. For example, with a given connection configuration of the first connection portion with the converter housing such, for example, as with a given positioning of the rivet portions at the converter housing, it is possible to adapt to many different types of torque converters by varying the extension length of the plate-like part. Structural changes are ultimately required only in the area of the second connection portion. The axial extension may also be adapted to a particular application by bending or angling the plate-like part without requiring any steps for changing the torque converter or other components.

An engagement arrangement such, for example, as an internal thread, may be provided in the area of the second connection portion remote of the first connection portion.

The engagement arrangement may be economically realized when it is formed integral with the plate-like part.

Alternatively, the engagement arrangement may also be formed in a separate engagement part secured to the plate-like part.

The at least one connection part may be, for example, formed by stamping sheet metal in a particularly simple and economical manner.

The present invention is further directed to a connection element for the connection of a hydrodynamic torque converter with a rotating shaft comprising a first connection portion with a circumferential extension which is limited with respect to a rotational axis of the converter and at least one rivet opening provided therein for arranging the connection element at a converter housing and a second connection portion for connecting the connection element with a rotating shaft or a component coupled therewith.

The present invention is also directed to a hydrodynamic torque converter having a connection arrangement according to the invention.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 1 shows an axial view of a connection element according to an embodiment of the present invention;

FIG. 2 shows a side view of the connection element shown in FIG. 1;

FIG. 3 is a partial longitudinal sectional view through a connection element connected with a converter housing according to another embodiment of the present invention;

FIG. 4 is a partial longitudinal sectional view through a connection element connected with a converter housing according to yet a further embodiment of the present invention.

DETAILED DESCRIPTION OF THE PRESENTLY PREFERRED EMBODIMENTS

Figure 5:
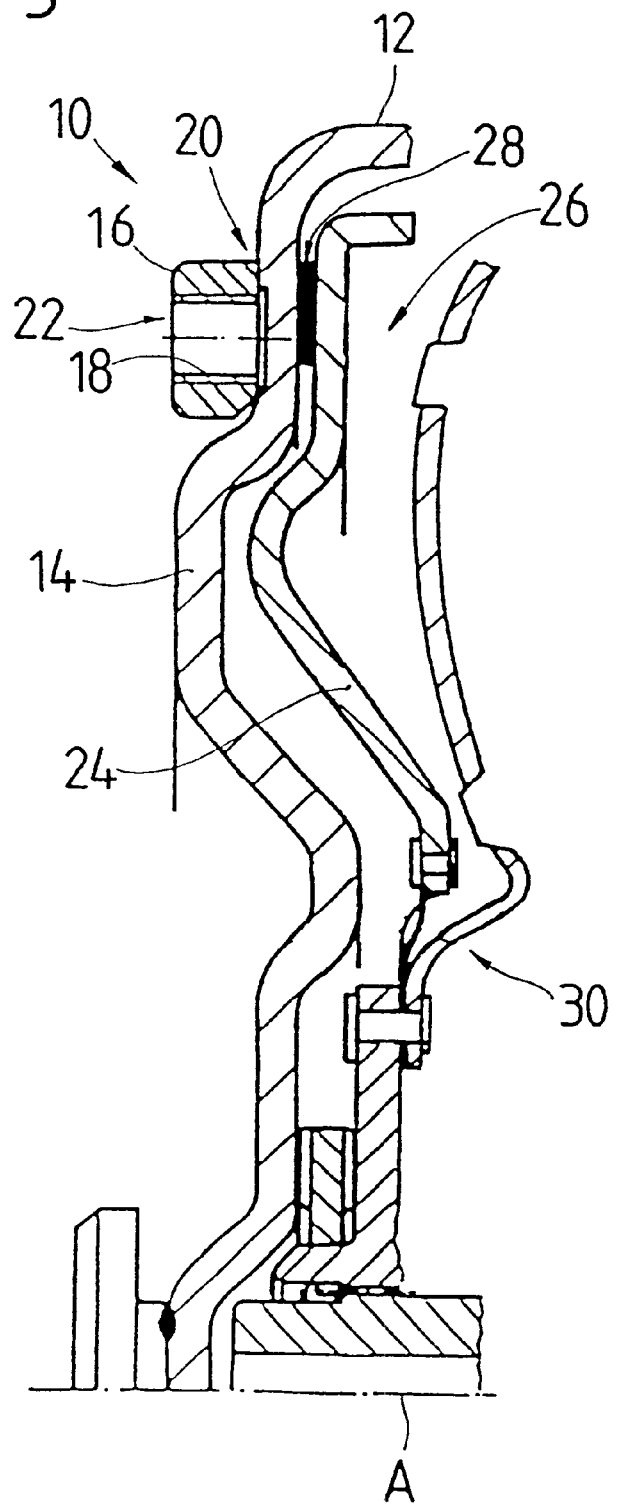
FIG. 5 shows a partial longitudinal section through a torque converter having a prior art connection element.

A hydrodynamic torque converter has already been described above with reference to FIG. 5, wherein only those portions of the hydrodynamic torque converter relevant for the present invention are shown in FIG. 5. It is noted that, of course, the converter housing is coupled with an impeller wheel with impeller blades arranged thereon and that a stator supported on a supporting shaft is located between the turbine wheel, with turbine blades arranged thereon, and the impeller wheel. The specific constructional type of the different components of the torque converter is of secondary importance for the subject matter of the present invention. Accordingly, many variations are possible. For example, a torsional vibration damper may be integrated in the area of the lockup clutch, or the lockup clutch may comprise a plate coupled with the turbine wheel, wherein the piston 24 of the lockup clutch is held with the housing so as to be fixed with respect to rotation relative to it.

The connection arrangement according to the present invention will be described in the following with reference to FIGS. 1 to 4.

FIG. 1 shows a connection element 40 having a substantially circular segment-like, i.e., arcuate first connection portion 42. A plate-like part 46 forming a second connection portion proceeds radially from a central area 44 of the connection portion 42.

In the first connection portion 42, a plurality of openings are formed successively approximately along the circumferential direction with respect to an axis of rotation. The plural openings include openings 48 which form rivet openings which are penetrable by rivet portions provided on the converter housing 12 or at the cover 14. The connection of the rivets in the openings 48 will be described in the following with reference to FIG. 3. Further, three additional openings 50 functioning as alignment openings or alignment recesses may be included in the first connection portion 42.

Alignment projections (not shown) which are likewise formed out at the housing cover 14 may, for example, engage these alignment openings 50. The connection element 40 and 5 housing cover 14 may be aligned in a defined manner via the alignment openings 50 and the alignment projections. However, it is noted that this function of position alignment can also be carried out by the rivet portions and the accompanying rivet openings 48 if these components are given suitably precise manufacture.

FIG. 2 shows that an axially extending formed-out portion or press-through portion 52 is provided on the plate-like part 46 and forms an integral part of the connection element 40. An internal thread 54 is arranged at an inner circumferential surface of the formed-out portion or press-through portion 52. The press-through portion 52 may be produced, for example, by generating a deformation via a die or the like. The end area of the deformation may then be opened and the internal thread 54 is formed in this end area by an appropriate thread cutting tools. Screws or other threaded connecting elements may then be screwed into the internal thread 54, as was already described above with reference to the nut elements 16 in the prior art (see FIG. 5). A flex-plate or similar element may then be connected with the connection element 40 by these screws.

For uniform coupling of the converter housing 12 with the rotating shaft, a plurality of the connection elements 40 shown in FIGS. 1 and 2 and described above are arranged so as to be distributed along the circumference of the converter housing at a uniform circumferential distance from one another. Corresponding rivet portions are produced, for example, by pressing out at the converter housing. This pressing out may be effected at a given radial position of the converter housing, regardless of the type of converter housing or torque converter. Accordingly, the same tools may be used for connecting different types of converter housings or torque converters. Rather, to adapt to different converters or converter housings, an appropriately long or short construction of the plate-like second connection portion 46 is provided and the first connection area 42 with its hole or opening pattern is unchanged as given by the rivet portion configuration. In addition, the second plate-like connection portion 46 may also be bent in the axial direction, as shown in FIGS. 3 and 4, to effect an axial adaptation.

Since the connection elements 40 have limited circumferential extension, these connection elements 40 may be stamped out of strip material by a stamping process in a simple manner and without extensive material waste. This stamping process would not be used as efficiently if annular connection elements were used. Furthermore, because of the limited circumferential extension, the deformation characteristics of the converter remain substantially unimpaired and bending processes may be effected in a simple manner to adapt to different configurations, which would likewise not be the case with an annular connection element. Also, by economizing on mass added to the torque converters, a change in the inertia behavior of the torque converter made by the connection elements is minimized. Furthermore, the manufacture of connection elements 40, particularly with the formed-out portion or press-through portion 52 and internal thread 54 which are provided integral therewith, has the advantage that alignment of the parts may be realized in a simple manner in a finishing machine, wherein the shape of the connection elements 40 essentially need not be taken into account otherwise because of the limited dimensions.

FIG. 3 shows another embodiment of the connection element shown in FIGS. 1 and 2 arranged at a cover 14 of a converter housing 12. A rivet portion 56 is provided integral with the converter housing 12 which penetrates one of the rivet openings 48. The rivet portion 56 is then pressed flat by application of a riveting tool to form a rivet head 58. In this way, the introduction of heat into the housing cover 14 during the connection process is avoided, so that subsequent machining may be omitted. The subsequent machining would be necessary if a welding process were used because of the deformation occurring due to the introduction of heat.

FIG. 3 also shows an axially bent area 60 of the plate-like second connection portion 46, as described above. The radial extension length of the plate-like projection 46 for adapting to another configuration is appreciably increased in comparison with the embodiment shown in FIGS. 1 and 2. Furthermore, the formed-out or pressed-out portion 52 with the pass-through thread may also be seen.

FIG. 4 shows a further embodiment in which a separate nut element 62 is secured to the second connection portion 46 instead of the internal thread 54 formed in the formed-out or pressed-out portion 52. In this embodiment, the second connection portion 46 has a stepped opening 66 in its radial outer area 64. The nut element 62 is pressed into an area 68 of the stepped opening 66 that has a greater diameter. The nut element 62 may, for example, be secured to the second connection portion 46 by welding or other connection method. The embodiment of FIG. 4 is advantageous in that different materials adapted to the respective requirements may be used in this case for the connection element 40. For example, the nut element 62 may comprise a different material than the first and second connection portion 42, 46.

It is noted, in addition, that through-openings may also be provided instead of the formed-out or pressed-out rivet portions 56 and, possibly, also instead of the alignment projections in the housing cover 14. Separate rivet portions may be used to penetrate through these through-openings when carrying out the riveting processes. However, care should be taken in this respect to ensure that a completely tight closure is achieved toward the converter interior after the riveting process is performed and that a completely flat surface closure or termination is obtained on the inner surface of the torque converter in the event that this riveting area is located at the same place that the effective surface regions of a lockup clutch are arranged.

The invention is not limited by the embodiments described above which are presented as examples only but can be modified in various ways within the scope of protection defined by the appended patent claims.

We claim:

1. In a hydrodynamic torque converter having a housing and an axis of rotation, a connection arrangement for rotatably connecting the hydrodynamic torque converter with a rotating shaft, comprising at least one connection element at the hydrodynamic torque converter housing having a first connection area arranged on the hydrodynamic torque converter and a second connection area connectable to the rotating shaft, wherein said first connection area comprises an arcuate extension along a circumferential direction about an axis of rotation and includes at least one rivet opening, said housing having at least one protuberance on said housing inserted through said at least one riveting opening and having a flattened end for connecting said connection arrangement to said housing, wherein said first connection portion further comprises at least one alignment recess for receiving a respective alignment projection and wherein said at least one rivet opening and said at least one alignment recess are arranged in alternate succession along the circumferential direction.

2. The connection arrangement of claim 1, wherein said at least one rivet opening comprises a plurality of rivet openings arranged in succession along the circumferential direction.

3. The connection arrangement of claim 1, wherein said first connection portion comprises a circular segment configuration.

4. The connection arrangement of claim 1, wherein said second connection portion comprises a plate proceeding from the first connection portion.

5. In a hydrodynamic torque converter having a housing and an axis of rotation, a connection arrangement for rotatably connecting the hydrodynamic torque converter with a rotating shaft, comprising at least one connection element at the hydrodynamic torque converter housing having a first connection area arranged on the hydrodynamic torque converter and a second connection area connectable to the rotating shaft, wherein said first connection area comprises an arcuate extension along a circumferential direction about an axis of rotation and includes at least one rivet opening, said housing having at least one protuberance on said housing inserted through said at least one riveting opening and having a flattened end for connecting said connection arrangement to said housing, wherein said second connection portion comprises a plate proceeding from said first connection portion and wherein said second connection portion comprises an engagement arrangement including and internal tread in an area of said second connection portion remote from said first connection portion.

6. The connection arrangement of claim 5, wherein said engagement arrangement comprises an integral part with said plate.

7. The connection arrangement of claim 5, wherein said engagement arrangement comprises an engagement part secured to said plate.

8. The connection arrangement of claim 1, wherein said at least one connection element comprises a stamped sheet metal part.

\* \* \* \* \*